Aug. 21, 1945.  C. L. EKSERGIAN  2,383,374
BRAKE MECHANISM
Filed March 15, 1944  2 Sheets-Sheet 1

INVENTOR.
Carolus L. Eksergian
BY
ATTORNEY

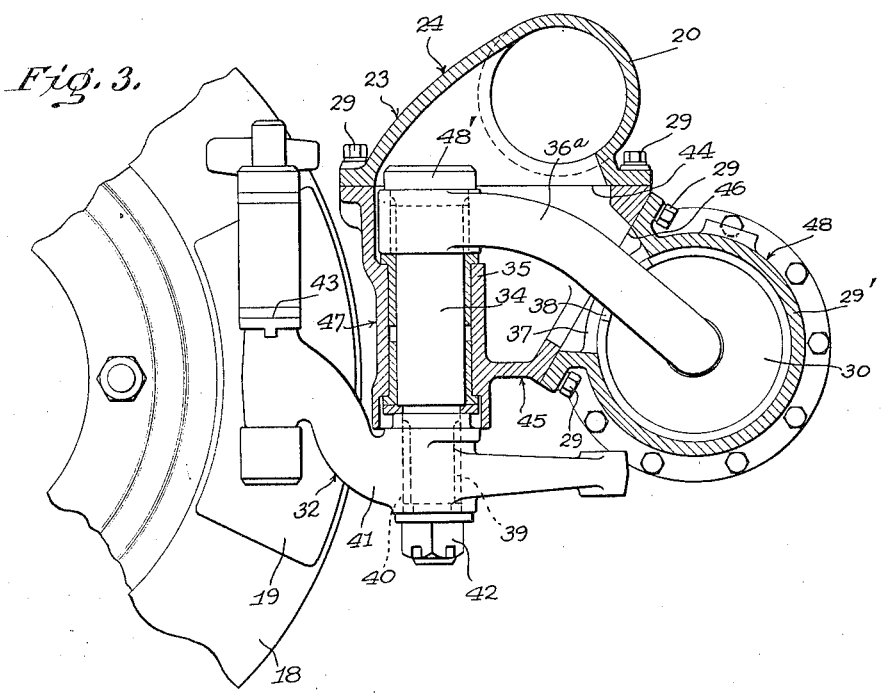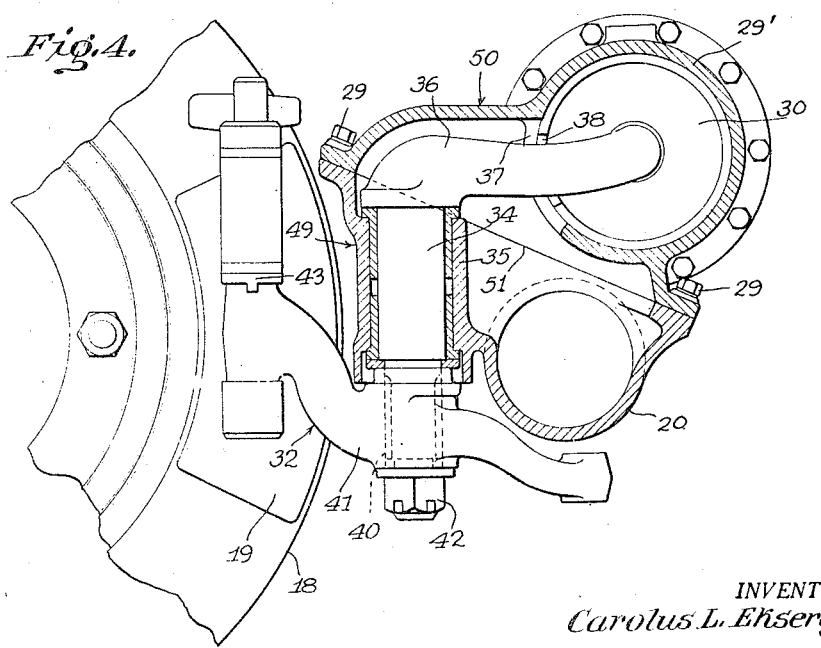

Patented Aug. 21, 1945

2,383,374

UNITED STATES PATENT OFFICE 2,383,374

BRAKE MECHANISM

Carolus L. Eksergian, Detroit, Mich., assignor to Budd Wheel Company, Philadelphia, Pa., a corporation of Pennsylvania Application March 15, 1944, Serial No. 526,514

8 Claims. (Cl. 188—153)

The invention relates to a brake mechanism and more particularly to such mechanism applied to vehicles, such as railway trucks.

The invention is more particularly concerned with brake mechanism of the general type disclosed in copending application, Serial No. 399,779, filed June 26, 1941, in which the brake rotor or rotors are disc-like members arranged to rotate with a wheel or wheels of a wheel and axle assembly supporting a vehicle frame. With each disc-like member are operatively associated a pair of non-rotary brake elements or shoes, and these shoes and their associated operating means are carried by a brake supporting yoke comprising longitudinally extending end members supported from the associated wheel and axle assembly, the ends of said members remote from said assembly being interconnected by a tubular transverse member having its central offset portion supported from the vehicle frame. In the region of each of the rotary disc-like members, the support is expanded into an enlarged housing enclosing the brake cylinder actuator and a major part of the brake levers carrying the non-rotary elements or shoes.

It is a general object of the invention to simplify the construction of the enlarged housing by dividing it variously into parts demountable from each other in such ways as to facilitate the manufacture and provide for ease of accessibility to the parts within the housing.

It is also an object to so construct these housings as to prevent disruption of the C- or U-frame brake support, when parts are removed or replaced. The cylinder actuator is arranged outside of the housing proper, where both ends thereof, which are provided with removable closures, are readily accessible at all times.

Other and further objects and advantages and the manner in which they are attained will become apparent from the following detailed description when read in connection with the drawings forming a part of this specification.

Figure 1:
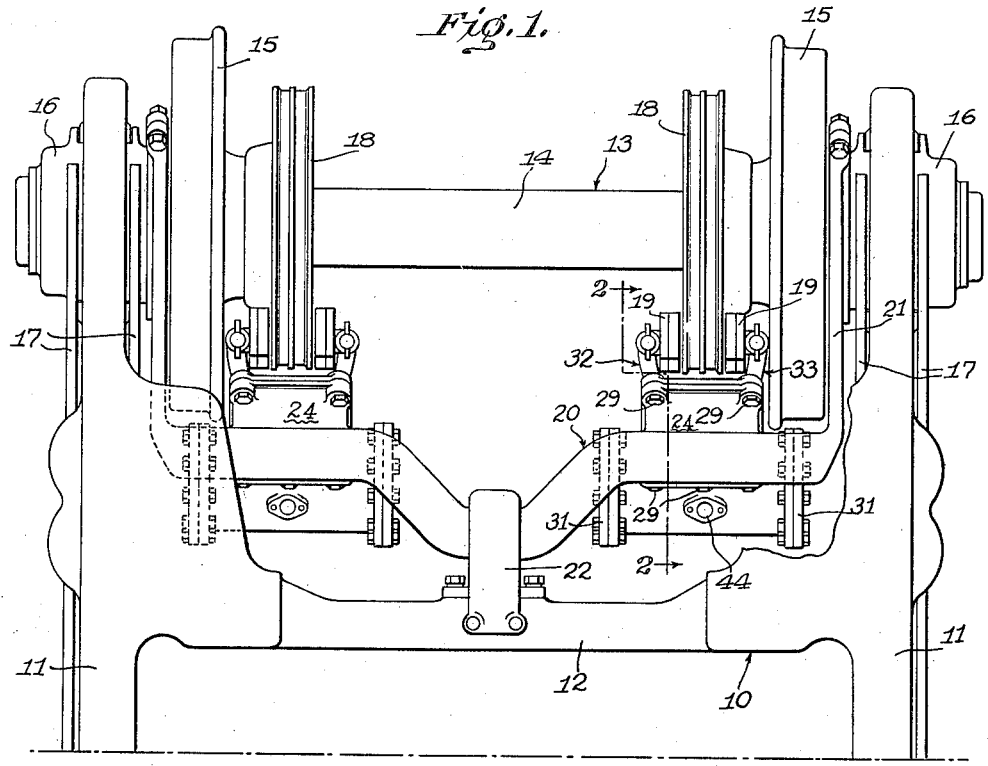
Fig. 1 is a plan view of one-half of a railway truck showing the invention applied thereto.

As shown clearly in Fig. 1 of the drawings, the vehicle to which the invention is shown applied comprises a railway truck having frame 10 including side frames 11 interconnected by transoms, as 12. The frame 10 is supported adjacent its ends by wheel and axle assemblies, as 13, which are each comprised of the axle 14 and wheels 15 adjacent the opposite ends thereof together with the journal boxes 16 within which the axle rotates. The frame 10 is spring-supported from the wheel and axle assemblies in the usual manner through the equalizer bars 17 having their ends resting upon the adjacent journal boxes.

Each wheel 15 has associated therewith to rotate with it, a brake rotor, such as the disc-like brake member 18. Non-rotary brake elements, such as the segmental shoes 19 are disposed on opposite sides of each rotary member 18 in cooperative relation therewith.

For the support of the shoes and their actuating means, there is provided a generally U- or C-shaped frame comprising a tubular transverse member 20 interconnecting longitudinally extending end members 21 supported from the adjacent wheel and axle assembly. The central portion of the transverse member 20 is offset and supported in this offset region by a bracket 22 carried by the adjacent transom 12.

Figure 2:
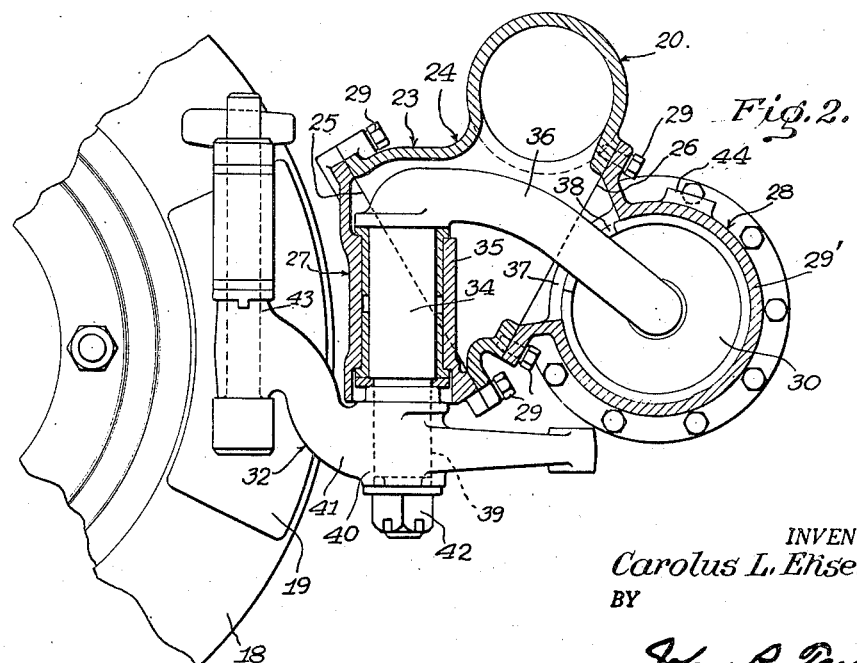
Fig. 2 is an enlarged detail sectional view taken substantially along the line 2—2 of Fig. 1, and Figs. 3 and 4 are views similar to Fig. 2, showing two modified arrangements.

As can be readily seen from Figs. 1 and 2, the tubular member 20 is expanded in the region of each rotary member 18 into an enlarged housing enclosing most of the mechanism for supporting and actuating the shoes 19 cooperating with said member.

It is more particularly with the construction of this housing and the manner of association of the brake parts therewith and its relation to the support frame as a whole that the present invention is concerned. The desirable features in such arrangement are protection against dust and water, compactness and accessibility to the parts within the housing for replacement or repair or for other reasons.

These desiderata are achieved according to the form shown in Figs. 1 and 2, by disposing the transverse member 20 at top and expanding in downward direction to form an integral part of the enlarged housing generally designated by 24. The part 23 of the housing is formed with oppositely inclined seats along the transverse planes 25 and 26, with which seats mating seats on parts 27 and 28, respectively, are associated. The parts 23, 27, and 28 are demountably secured together along their continuous mating seats in the planes 25 and 26, respectively, by the series of bolts designated generally by 29. When these parts are so secured together they together form the enlarged housing 24 to receive parts of the brake mechanism.

The part 28 carries the brake cylinder actuator comprising the cylinder 29' and a pair of pistons, as 30. It will be seen that the cylinder is offset laterally from its seating plane 26 on the part 23 so that it is wholly without the main body of the housing. This arrangement permits the use of a cylinder having removable end closures, as 31, affording ready accessibility to the inside of the cylinder at any time by the removal of these end closures.

The part 27 pivotally mounts the brake levers 32 and 33, respectively, carrying the brake shoes 19 disposed in operative relation with the opposite faces of the adjacent disc 18. Each of these levers comprises a pivot portion 34 mounted in an elongated bushed bearing 35 carried by the part 27 and has an integral arm 36 extending within the housing through openings 37 and 38 in the cylinder and skirt of adjacent piston, respectively, with its end arranged in abutting relation with the associated piston 30.

The pivot portion 34 has a reduced portion 39 extending outside the housing and to this portion is non-rotatably secured by a splined connection (not shown) the hub 40 of a two-armed lever 41, the parts being held assembled by a nut 42 threaded onto the reduced end of the extension 39. The lever 41 has its one arm pivotally supporting the adjacent shoe 19, as indicated at 43, and its other arm may serve for connection to the manually-operated means for the emergency application of the brakes. Suitable means, such as a spring interconnecting the arms 36 of the levers 32 and 33, but not shown herein, may be provided to return the brake parts to the inoperative position shown in Fig. 1. The brake cylinder is provided with a port, as 44, opening to the space between the pistons 30 and fluid under pressure is admitted through this port to force the pistons apart, swing the levers 32 and 33 about their pivots and apply the brake shoes 19 to the opposite faces of the disc 18.

With this arrangement, it will be seen that either the part 27 carrying the brake levers or the part 28 carrying the cylinder actuator may each be assembled or disassembled with the transverse member 20, independently of each other, or both together and this without disrupting the continuity of the member 20.

The inclined arrangement of the planes of joinder 25 and 26 provides for compactness of arrangement in longitudinal direction, which is a desirable feature where space is at a premium, as in most railway truck structures.

The arrangement according to the modification of Fig. 3 is generally similar to that shown in Figs. 1 and 2, except that in this case the planes of division are so arranged that the brake levers and cylinder may be removed as a unit from the transverse support member 20 or the cylinder alone may be removed in a manner similar to that shown in the preferred form.

In this view corresponding parts will be referred to by similar reference numerals. According to this form the part of the housing 23 integral with the tubular support member 20 is divided from the remainder of the housing along a substantially horizontal transverse plane 44 disposed just below the normal diameter of said member, the remaining portion of the housing is bolted to the part 23 through the interseating continuous faces formed on the respective parts along this line, as by a series of bolts 29.

The remaining portion of the casing, designated as a whole by the reference numeral 45, is again divided along the inclined transverse plane 46 into two parts 47 and 48 which are demountably secured together along their interseating surfaces in said plane by bolts 29. The part 47 mounts the brake levers which are similar and mounted similarly to the mounting of the levers in the preferred form. The only change resides in the fact that the arm 36a of the lever is a separate arm splined to the pivot portion, which is in this case provided with a head 48' engaging the top of the arm. With the arrangement shown it will be evident that the parts of the housing 47 and 48 with the elements associated therewith may be demounted as a unit from the part 23 integral with the tubular member 20, or the brake cylinder portion 48 may be demounted alone, as desired, and either of these units may thus be readily replaced by another similar unit.

In the third modification, shown in Fig. 4, the transverse member 20 is arranged at the bottom and is formed in the enlarged housing region by an integral portion 49 forming the main body of the housing and a brake cylinder carrying portion 50 secured thereto to form the complete housing along the transverse plane indicated at 51. As in the other modifications bolts 29 secure the parts 49 and 50 together along their continuously mating seat portions in said plane. By inclining the plane of joinder at an angle to the horizontal, as shown, the vertical dimension of the housing may be kept small while at the same time permitting the cylinder to be disposed wholly without the main body portion 49 of the housing, when the removable ends thereof may be removed at any time for access to the cylinder interior. The cylinder carrying unit may itself be readily mounted or dismounted without disturbing the brake levers, etc., mounted on the main body portion 49.

The operation of these two modified forms of mechanism shown in Figs. 3 and 4 will be substantially the same as the operation of the mechanism of the main form.

All the forms have the advantageous features of compactness of arrangement combined with ready accessibility to various parts of the closed housing and ready replacement and repair of a greater or smaller portion of the housing.

While several specific embodiments have been herein described in detail, it will be understood that changes and modifications may be made without departing from the main features of the invention, and such changes and modifications are intended to be covered by the appended claims.

What is claimed is:

1. In a brake mechanism, a rotary disc-like brake member, a pair of non-rotary brake elements arranged in cooperative relation with the opposed faces of said rotary member, a brake support including a transversely extending member expanded into an enlarged housing in the region of said rotary member, said housing comprising a main body portion divided along a transverse plane from a separate portion carrying a cylinder actuator which is disposed wholly without the main body portion and having removable end walls, means demountably securing said portions together, and brake levers pivotally mounted in the main body portion and operatively associated with the respective non-rotary elements and said actuator.

2. In a brake mechanism, a rotary disc-like brake member, a pair of non-rotary brake elements arranged in cooperative relation with the opposed faces of said rotary member, a brake support including a transversely extending member expanded into an enlarged housing in the region of said rotary member, said housing comprising a main body portion and a separate cylinder portion divided along a plane generally paralleling the axis of said member but inclined to the horizontal, a cylinder actuator carried by said cylinder portion and disposed wholly without the main body portion, means demountably securing said portions together, and brake levers pivotally mounted in said main body portion and operatively associated with respective non-rotary elements and said actuator.

3. In a brake mechanism, a rotary disc-like brake member, a pair of non-rotary brake elements arranged in cooperative relation with said member, a brake support including a transversely extending tubular member expanded into an enlarged housing in the region of said rotary member, said housing comprising a main body portion divided along a transverse plane into separable parts demountably secured together, and a separate cylinder portion, carrying a cylinder actuator divided along a transverse plane from said main body portion and demountably secured thereto with the cylinder wholly outside the main body portion, one of the parts of said main body portion pivotally mounting a pair of brake levers cooperating with the respective non-rotary elements and said cylinder actuator.

4. In a brake mechanism, a rotary disc-like brake member, a pair of non-rotary brake elements arranged in cooperative relation with said member, a brake support including a transversely extending tubular member expanded in downward direction into an enlarged housing, said housing comprising a main body portion divided by a transverse plane outside the normal diameter of the tubular member into two parts, said parts being demountably secured together and one of them carrying a brake cylinder actuator disposed wholly outside the other part, and said other part pivotally carrying a pair of brake levers operatively associated with the respective non-rotary elements and said actuator.

5. In a brake mechanism, a rotary disc-like brake member, a pair of non-rotary brake elements arranged in cooperative relation with said member, a brake support including a transversely extending tubular member expanded in upward direction into an enlarged housing in the region of said rotary member, said housing comprising a main body portion and a separate portion carrying a cylinder actuator, divided along a transverse plane inclined to the horizontal, downwardly in a direction away from said rotary member, means for demountably securing said portions together, the cylinder actuator carried by said cylinder portion being disposed outside the main body portion, and a pair of brake levers pivotally carried by said main body portion and operatively associated with the respective non-rotary elements and said actuator.

6. In a brake mechanism, a rotary disc-like brake member, a pair of non-rotary brake elements arranged in cooperative relation with said member, a brake support including a transversely extending tubular member expanded into an enlarged housing in the region of said rotary member, said housing comprising a main body portion and a cylinder-actuator-carrying portion demountably secured to the main body portion along a transverse plane inclined to the horizontal with the cylinder disposed outside the main body portion, the main body portion being further divided by a transverse plane, inclined to the horizontal in a direction opposite from said first-named plane, into parts demountably secured along said plane, one of said parts pivotally carrying a pair of brake levers operatively associated with the respective non-rotary elements and said actuator.

7. In a brake mechanism, a rotary disc-like brake member, a pair of non-rotary brake elements arranged in cooperative relation with said member, a brake support including a transversely extending tubular member expanded into an enlarged housing in the region of said rotary member, said housing comprising a portion integral with said tubular member and another portion demountably secured thereto along a substantially horizontal transverse plane outside the normal diameter of said tubular member, said other portion being again divided along another transverse plane inclined to the horizontal into two parts demountably secured together along said other plane, one of said parts carrying a brake cylinder actuator and the other pivotally carrying a pair of brake levers operatively associated with the respective non-rotary elements and said actuator.

8. In a brake mechanism, a wheel and axle assembly, a vehicle frame supported thereby, a pair of rotary disc-like brake members mounted to rotate with the respective wheels of said assembly, non-rotary brake elements disposed in cooperative relation with the opposite faces of the respective rotary members, and a yoke-like brake support having its ends supported adjacent the ends of said assembly and its intermediate portion, from the vehicle frame, said brake support comprising, in the region adjacent each rotary member, an enlarged housing divided along a transverse plane into main body and brake cylinder portions, with the brake cylinder of the latter portion wholly without the main body portion, and brake levers pivotally mounted in the main body portion of the housing and having arms extending into the cylinder portion in cooperative relation with the brake cylinder therein and other arms extending outside the housing and adapted to cooperate with the respective non-rotary elements associated with the adjacent rotary member.

CAROLUS L. EKSERGIAN.